March 3, 1942.  C. W. BRABENDER  2,275,341
MEANS FOR TESTING DOUGH
Filed Feb. 4, 1937  2 Sheets-Sheet 1

Inventor:
Carl Willy Brabender
By: Richardson & Auer
Attys

March 3, 1942.                C. W. BRABENDER                2,275,341
                            MEANS FOR TESTING DOUGH
                        Filed Feb. 4, 1937         2 Sheets-Sheet 2

Inventor:
Carl Witty Brabender

Patented Mar. 3, 1942

2,275,341

UNITED STATES PATENT OFFICE 2,275,341

MEANS FOR TESTING DOUGH

Carl Willy Brabender, Duisburg, Germany

Application February 4, 1937, Serial No. 124,066
In Germany February 10, 1936

2 Claims. (Cl. 265—16)

To measure the structural properties of doughs, various devices are known, e. g., the extensometer and the comparator. These devices have various defects; they do not, for example, permit the testing of the extensibility and the resistance to extension of fermenting doughs. Thin sheets of dough of comparatively very small diameter are tested, and since gas particles are unevenly distributed in the dough, it may happen that a sheet of dough in which a comparatively large number of gas particles are contained shows a different resistance to extension than corresponds actually to the whole structure of the dough.

It has consequently been found advisable to roll out a sample of dough in substantially cylindrical form and to subject the test sample to extension by means of a hook or the like which is driven by means of a motor, and to measure the resistance offered to the extension by the dough.

Larger quantities of dough can be investigated with a process of this kind, and hence the uneven distribution of fermenting gases in the dough is of no consequence with respect to the results of the test.

Two rubber bands moving at different speeds, or a roller rotating in a casing are particularly suitable for the purpose of preparing the test sample, the dough being placed between the rubber bands or between the roller and the casing wall.

Means for testing dough according to the invention are shown in the accompanying drawings, in which:

Fig. 1 represents an embodiment of a device for measuring the extensibility of dough and its resistance to extension;

Fig. 2 indicates the structure of a trough for receiving a dough sample for testing;

Figures 1, 2, 2A:
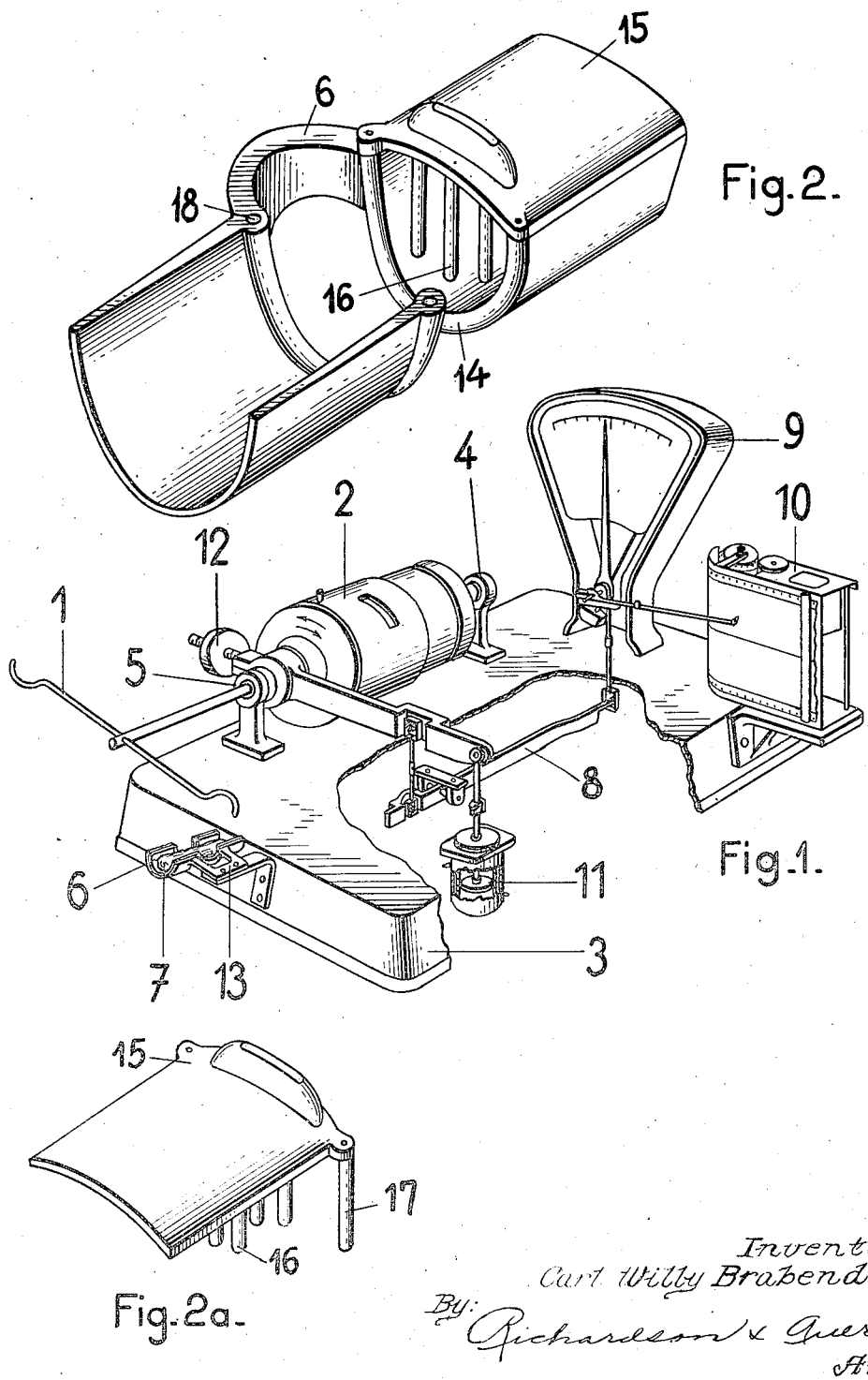
Fig. 2a shows a clamp-like member for securing the dough sample in place in the trough.

The invention will now be described first with reference to Figs. 1, 2, and 2a.

The hook 1 for the extension of the dough roll or dough sample is driven by a motor 2 through a suitable gear, at a speed of about ½ R. P. M., the armature of the motor resting on bearings 4 and 5 arranged on a base plate 3. The casing of the motor is freely oscillatable; thus, the resistance or force opposed to the rotation of the armature shaft results in a rotation of the motor casing in a direction reverse to the sense of rotation of the armature shaft (dynamometer principle). The sample roll of dough 7 resting on the removable trough 6 offers resistance to the motion of the hook 1, driven by the motor and connected to the armature shaft; the motor casing will rotate more or less, according to the resisting force, which depends on the structure of the dough. The motor casing is connected to a balance 9 by means of a lever system 8, which, in the embodiment shown in the drawings, comprises two levers. The rotations of the motor casing are thus transmitted to the balance 9 and indicated thereon. The balance in turn is connected to a recording device 10 which records the deflections of the pointer. The rotations of the motor casing are damped by an oil damper or dashpot 11. The removable trough 6 rests on the holder 13 arranged at the base plate 3.

Prior to the tests, the balance is set to zero by driving the hook 1 by the motor 2, without placing a dough sample into the way of the hook, and by setting the indicator of the balance 9 to zero, by means of the balance weight 12.

An embodiment of the trough 6 is shown in Figs. 2 and 2a. The trough 6 is provided with an opening 14 for the passage of the hook 1. The roll of sample dough is placed on the trough and firmly held on it by two clasps 15, one of which is shown in place on the trough and the other separate in Fig. 2a. On the inner side of the clamp members are provided prongs 16 for holding the dough sample and guide pins 17 for insertion into the holes 18 of the trough. In order to simplify the drawings, the clamps are not illustrated in Fig. 1.

Figure 3:
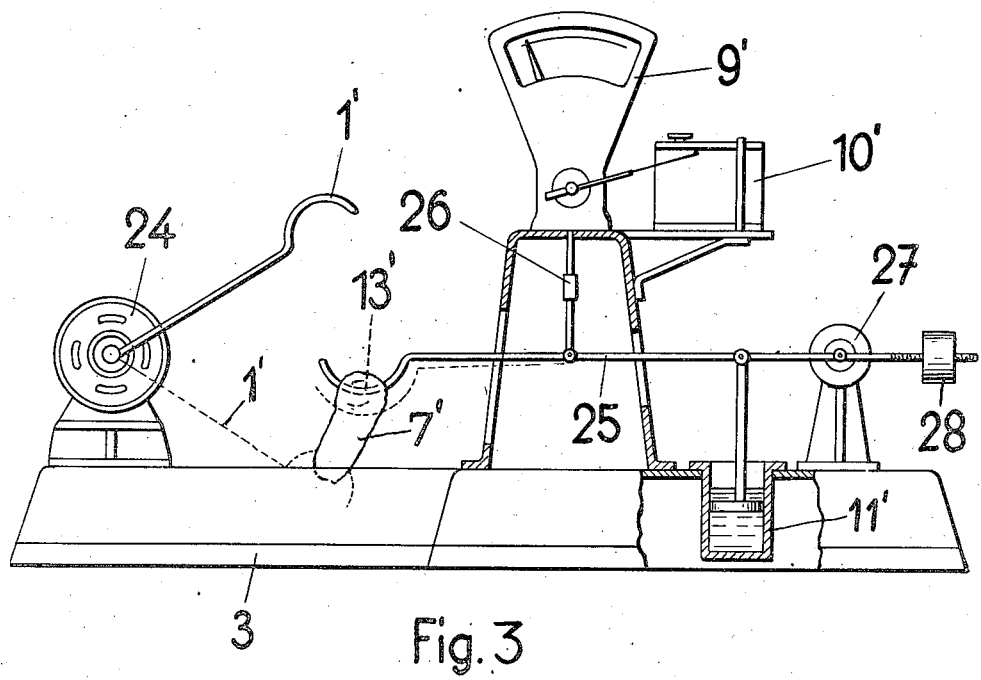
Fig. 3 shows a modified structure of a testing device.

Another embodiment of the invention for measuring the extensibility and the resistance to extension is represented in Fig. 3. This device differs from that of Fig. 1 substantially in that the hook 1' is driven by a motor 24, the casing of which is arranged on a base plate 3, the holder 13' being connected to the balance 9 by a scale beam 25 and a connecting piece 26. The scale beam oscillates in bearing 27 disposed on the base plate 3.

The structural properties of doughs may be measured with this device by placing a dough roll sample together with a trough such as 6 (Figs. 1, 2, and 2a), on the holder 13', then driving hook 1' by motor 24. According to the resistance offered to the rotation of the hook by the dough roll—this resistance depending upon the structure of the dough—the scale beam 25 will be depressed more or less. The motions of the scale beam are indicated by the balance and recorded by the recording device 10' connected to the balance. The balance weight 28 disposed on the balance serves for adjusting the latter. An oil damper 11' is provided for damping the oscillations of the scale beam 25.

Figure 4:
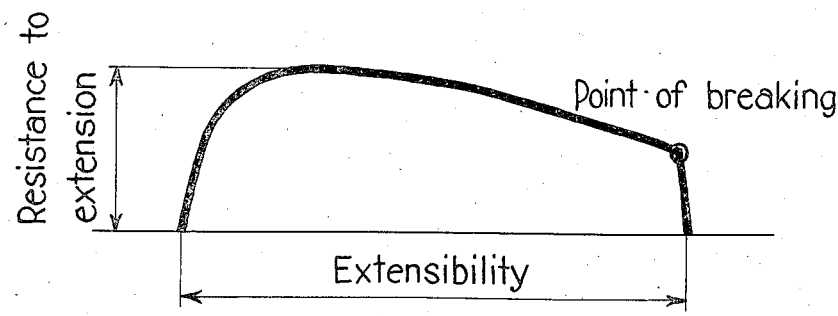
Fig. 4 represents a performance diagram.

Fig. 4 shows a performance diagram of the device made in accordance with the invention. The height of the diagram represents a measure of the resistance to extension, while the length of the diagram represents a measure of the extensibility of the dough under test. The point at which the curve drops suddenly represents the breaking point of the dough.

The invention also permits an investigation of the variations of the dough, which it undergoes responsive to an increase in temperature. First, a number of dough samples of like quantities, e. g., 150 g., are rolled out to form sample rolls, care being taken to make the samples of uniform diameter. The rolls are then subjected to tests at definite intervals of time, with the aid of the devices represented in Fig. 1 or 3. It will be found that the samples lose their strength with different speed, according to the quality of the flour used, as the resistance offered to the rotation of the hook by dough made of relatively poor grade flour drops considerably after a short time.

Of particular practical importance is the determination of the extensibility and of the resistance to extension of dough after and in consequence of repeated mechanical stressing. For, as is known, a dough can be strengthened extraordinarily, and better baking qualities can be produced, by pulling, drawing, rolling, kneading, and the like, that is, by working processes which in baking are usually accomplished both manually and by machines.

However, as already stated, dough loses its strength obtained by mechanical treatment, with varying rapidity. Dough from strong flour, retains its strength for a relatively long time, while the strength of dough made from weak flour drops again to the original value frequently within a few minutes.

It is also of interest to determine the degree of the strength with reference to the duration of the mechanical treatment by passing a number of samples of the same flour one or more times through a roller and then finding the resistance to extension by means of the extension meter.

The above-mentioned investigations cannot be carried out with the known devices, because the dough samples are subjected to an uncontrolled and varying mechanical stressing by the devices themselves prior to carrying out the proper tests, so that comparative test results are impossible. Only comparative test results, however, permit conclusions to be drawn as to the baking quality of flours.

What I claim is:

1. In combination, a motor driven shaft, a radial arm secured to said shaft and having a hook at the end which is adapted to be rotated in the circumference of a circle by said shaft, supporting means comprising parts located on opposite sides of the path of said hook when rotated, whereby a cylindrical sample of dough may be supported with its central portion adapted to be engaged by said hook, and means for visually indicating the resistance which the dough sample offers to movement of said hook.

2. The combination, with a radial arm adapted to be rotated so that one end portion thereof moves in a circular path, of means for applying a rotative torque to said arm at the other end thereof, a support for a dough sample comprising two parts, means supporting said parts in spaced relation on opposite sides of said path, means associated with each part for securing one end of a dough sample extending across said path in position to be engaged by said arm, and means for measuring the force required to rupture said sample by said arm.

CARL WILLY BRABENDER.